(12) United States Patent
Satoh et al.

(10) Patent No.: US 7,937,127 B1
(45) Date of Patent: May 3, 2011

(54) RADIO TERMINAL DEVICE

(75) Inventors: Noriyoshi Satoh, Kanagawa (JP);
Atsushi Sobukawa, Shizuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 09/528,126

(22) Filed: Mar. 17, 2000

(30) Foreign Application Priority Data

Mar. 18, 1999 (JP) .................................. 11-073809

(51) Int. Cl.
*H04M 1/00* (2006.01)
(52) U.S. Cl. ............... 455/575.7; 455/575.1; 455/575.5; 455/269; 455/63.4
(58) Field of Classification Search .................... 455/90, 455/90.1, 96.3, 550, 575, 575.1, 575.2, 575.5, 455/575.7, 903, 128, 347, 269, 300, 301; D14/137, 138; 379/429, 433.01, 433.11; 361/814
See application file for complete search history.

(56) References Cited

U.S. PATENT DOCUMENTS

| | | | | |
|---|---|---|---|---|
| 4,680,676 A | * | 7/1987 | Petratos et al. | 455/301 |
| 5,271,056 A | * | 12/1993 | Pesola et al. | 455/575.1 |
| 5,493,702 A | * | 2/1996 | Crowley et al. | 455/575.5 |
| 5,852,421 A | | 12/1998 | Maldonado | |
| 5,930,694 A | * | 7/1999 | Shima | 455/269 |
| 6,038,313 A | * | 3/2000 | Collins | 379/433.07 |
| 6,101,372 A | * | 8/2000 | Kubo | 455/90 |
| 6,137,050 A | | 10/2000 | Jochheim | |
| 6,281,433 B1 | * | 8/2001 | Decker et al. | 174/394 |
| 6,375,026 B1 | * | 4/2002 | Sheldrake et al. | 220/4.02 |
| 6,763,245 B1 | * | 7/2004 | Satoh et al. | 455/550.1 |
| 7,136,018 B2 | * | 11/2006 | Iguchi et al. | 343/702 |
| 7,443,351 B2 | * | 10/2008 | Komine | 343/702 |
| 7,539,510 B2 | * | 5/2009 | Toyoda et al. | 455/550.1 |
| 2006/0160585 A1 | * | 7/2006 | Miyagawa et al. | 455/575.7 |

FOREIGN PATENT DOCUMENTS

| | | |
|---|---|---|
| EP | 0 522 538 A2 | 1/1993 |
| EP | 0 727 932 A2 | 8/1996 |
| EP | 0 833 466 A2 | 4/1998 |
| JP | 9-74308 | 3/1997 |
| JP | 9-102710 | 4/1997 |
| JP | 9-214225 | 8/1997 |
| JP | 10-117224 | 5/1998 |

OTHER PUBLICATIONS

Webster's II, "New Riverside University Dictionary", 1984, p. 595.*
Office action from European patent application No. 00 105 767.8—1246, dated Jun. 4, 2007.

* cited by examiner

*Primary Examiner* — Nay Maung
*Assistant Examiner* — Richard Chan
(74) *Attorney, Agent, or Firm* — Pearne & Gordon LLP

(57) ABSTRACT

The present invention is for providing a radio terminal device having shock resistance and high rigidity capable of preventing breakage of the housing even in the case it is dropped from a hand, without the risk of deteriorating the performance of the stored antenna. The radio terminal device according to the invention comprises a printed board, a resin housing provided so as to cover one side surface of the printed board, a metal housing provided so as to cover the other side surface of the printed board, and an antenna provided on the one surface side of the printed board, wherein the resin housing and the metal housing are divided in a region elongating from the one side surface to the other side surface of the printed board.

11 Claims, 4 Drawing Sheets

FIG.2A
FIG.2B
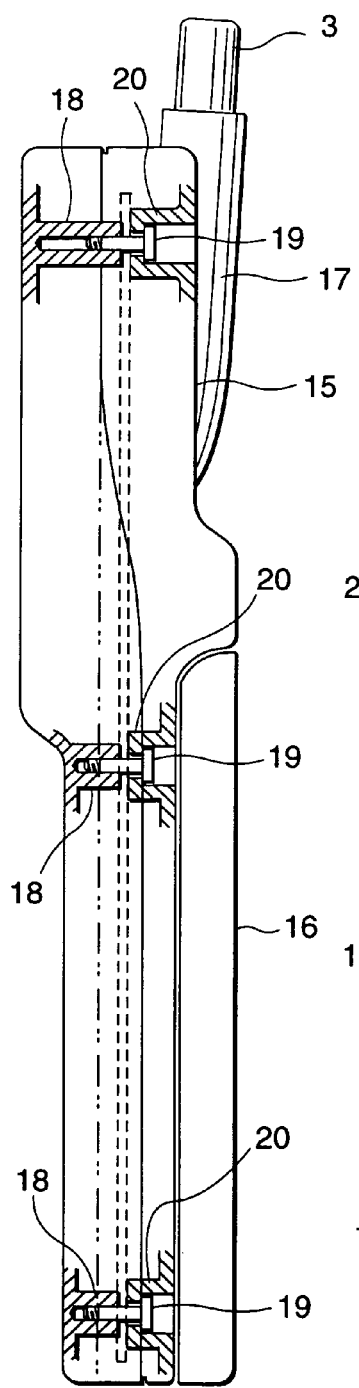
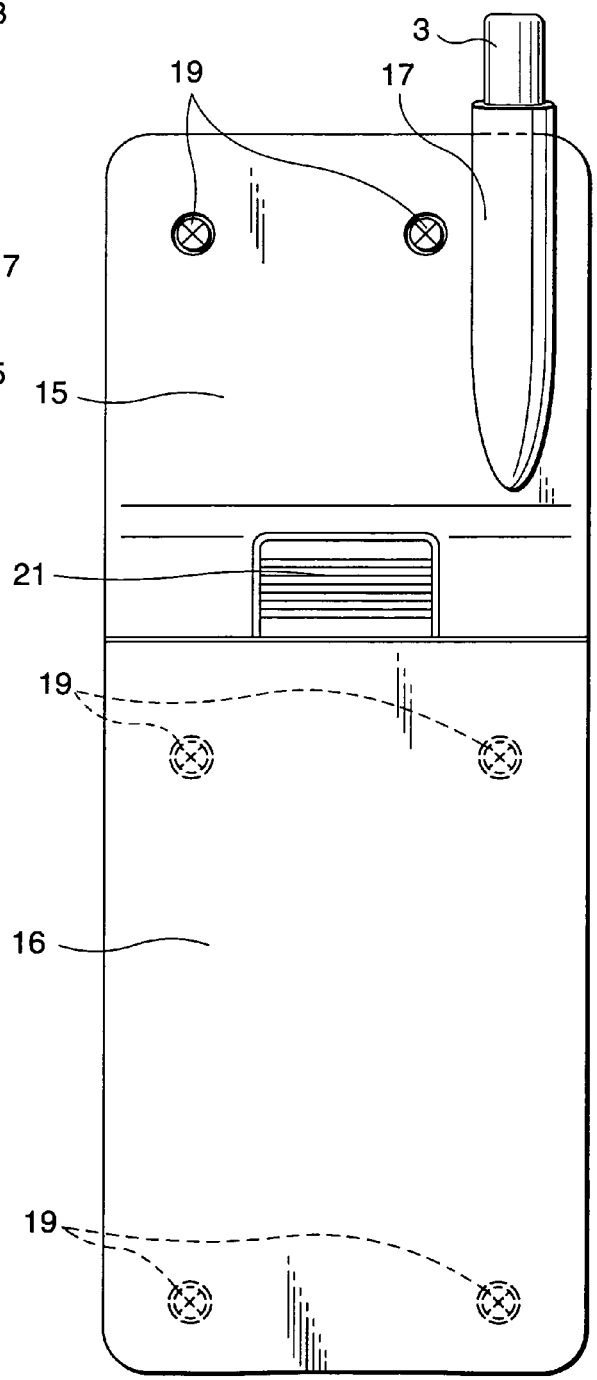

RADIO TERMINAL DEVICE

BACKGROUND OF THE INVENTION

1. Field of the Invention

The present invention relates to a radio terminal device, in particular, it relates to the configuration of a housing capable of realizing sufficient shock resistance and high rigidity as a radio terminal device.

2. Description of the Related Art

Conventionally, both of an upper case and a lower case of a radio device, such as a portable phone, are formed, in general, with a resin for achieving a light weight. However, a problem is involved in that if a user drops such a kind of radio device inadvertently, the housing might easily break.

Therefore, it is conceivable to provide the housing made of metal so as to reinforce the housing strength and the rigidity. However, since the metal does not transmit an electromagnetic wave (an electronic wave), although the housing made of metal is suitable for shielding electromagnetic waves, the housing made of metal is not appropriate to ensure the antenna characteristics.

SUMMARY OF THE INVENTION

Accordingly, an object of the present invention is to provide a radio terminal device having an antenna in a housing while shock resistance and high rigidity capable of preventing breakage of the housing are equipped even in the case the radio terminal device is dropped from a hand.

In order to solve the above-mentioned problems, the present invention comprises a printed board, a resin housing provided so as to cover one side surface of the printed board, a metal housing provided so as to cover the other side surface of the printed board, and an antenna provided on the one surface side of the printed board, wherein the resin housing and the metal housing are divided in a region elongating from the one side surface to the other side surface of the printed board.

Accordingly, the effect of providing sufficient shock resistance and high rigidity as a portable terminal device, capable of preventing breakage of the housing even in the case the user drops the device from a hand inadvertently as well as the effect of avoiding deterioration of the characteristics of the stored antenna can be achieved.

Since a first aspect of the invention is a radio terminal device comprising a printed board, a resin housing provided so as to cover one side surface of the printed board, a metal housing provided so as to cover the other side surface of the printed board, and an antenna provided on the one surface side of the printed board, wherein the resin housing and the metal housing are divided in a region elongating from the one side surface to the ocher side surface of the printed board, the effect of preventing breakage of the housing even in the case the user drops the device from a hand inadvertently as well as the effect of providing a configuration not inhibiting receipt of an electronic wave can be achieved.

Moreover, since a second aspect of the invention is the radio terminal device according to the first aspect, wherein the resin housing and the metal housing are divided with a curved line, the effect of maximizing the rigidity of the metal housing, the effect of avoiding deterioration of the characteristics of the stored antenna by providing the metal housing and the stored antenna too closely, and further, the effect of providing a thin housing can be achieved.

Furthermore, a third aspect of the invention is the radio terminal device according to the first aspect, wherein the printed board and the metal housing are connected electrically, the effect of sufficiently providing earth can be achieved owing to the metal housing.

BRIEF DESCRIPTION OF THE DRAWINGS

FIG. 2A is a vertical cross-sectional view taken on a different position, showing the configuration of the radio terminal device according to the embodiment of the invention.

FIG. 2B is a rear side view showing the configuration of the radio terminal device according to the embodiment of the invention.

DETAILED DESCRIPTION OF THE PRESENT INVENTION

The present invention will be described in detail with reference to the accompanying drawings.

Figure 1:
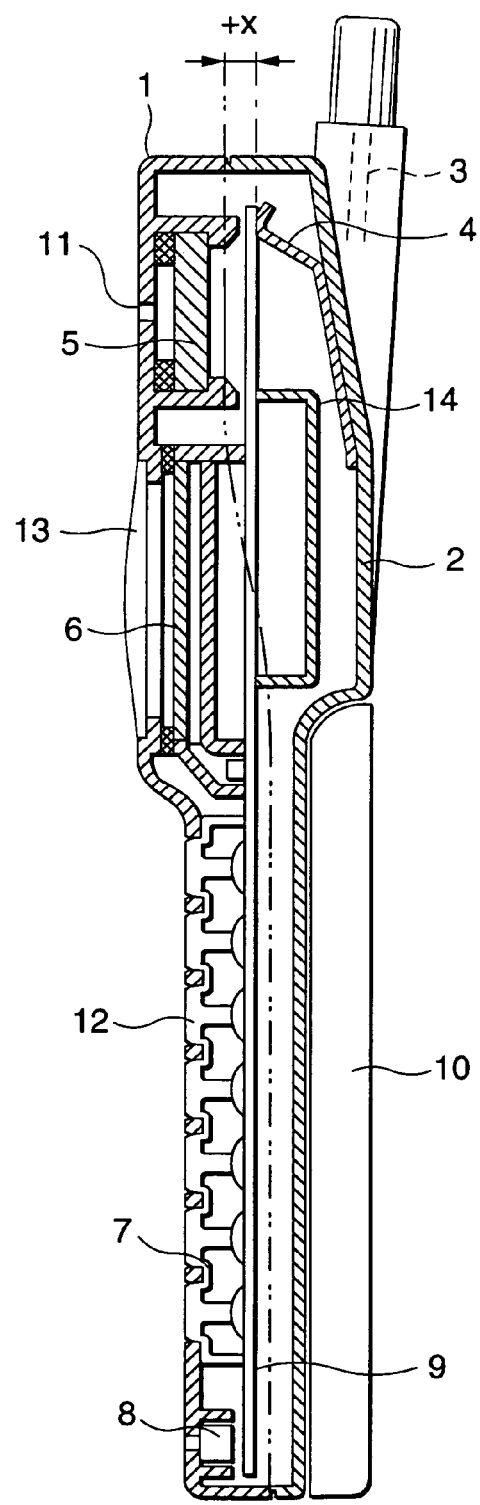
FIG. 1 is a vertical side cross-sectional view showing the configuration of a radio terminal device according to an embodiment of the invention.

FIG. 1 is a vertical side cross-sectional view showing the configuration of a radio terminal device according to an embodiment of the invention. As an example of a radio device, a portable phone (hereinafter referred to as an appliance) is described herein.

The appliance of FIG. 1 comprises a whip antenna 3 for transmission and receipt, a stored antenna 4 that is an internal antenna for receipt, a receiver 5 for outputting the sound, a liquid crystal display portion 6 for displaying characters or marks, a key sheet 7 with characters and marks printed thereon, a transmitter 8, and a printed board 9 in a housing comprising an upper case 1 and a lower case 2, with a detachable battery 10 mounted outside the housing for supplying a power source.

An oscillator for controlling the oscillating frequency by voltage (hereinafter referred to as VCO), a temperature compensating type crystal oscillator for controlling the frequency stably (hereinafter referred to as VC-TCXO), a plurality of resistors, capacitors, or the like, are mounted on the rear side of the printed board 9 so as to provide a receiving circuit portion (not illustrated) comprising a low noise and a first mixer. Furthermore, a modulator, a power amplifier (hereinafter referred to as PA), a plurality of resistors, capacitors, or the like, are surface mounted so as to for a transmitting circuit portion (not illustrated).

The receiving circuit portion (not illustrated) and the transmitting circuit portion (not illustrated) are covered with a resin shield case 14 for preventing entrance of an electromagnetic wave from the outside, or leakage of an electromagnetic wave to the outside.

The shield case 14 is made of a resin material, such as acrylonitrile-butadiene-styrene (ABS), with the surface thereof applied with the electroless copper plating so as prevent passage of an electromagnetic wave, and furthermore, the surface thereof applied with the electroless nickel plating so as to provide the anti-corrosion treatment for the electroless copper plating.

As to the configuration of the appliance, the receiver 5, the liquid crystal display portion 6, the key sheet 7, and the transmitter 8 are arranged from above on the front side of the printed board 9. Since the receiver 5 and the transmitter 8 need to be disposed in the vicinity of an ear and the mouth of the user, respectively, they are provided at the uppermost portion and the lowermost portion. Therebetween is provided a liquid crystal display portion 6 above the key sheet 7 so that the displayed marks, characters, or numbers inputted by the use of keys are not covered by the hand executing the input operation.

The transmitting circuit portion (not illustrated) and the receiving circuit portion (not illustrated) are formed in the upper part and a controlling circuit portion (not illustrated) is formed in the lower part on the rear side of the printed board 9. The portions comprise low electronic parts.

The transmitting circuit portion (not illustrated) and the receiving circuit portion (not illustrated) are covered with the shield case 14 as mentioned above. The controlling circuit portion (not illustrated) is formed substantially behind the key sheet 7, covered with the inside of the lower case 2 applied with aluminum deposition. That is, all of the above-mentioned circuit portions are shielded so as to prevent entrance or leakage of an electromagnetic wave. The controlling circuit portion (not illustrated) is covered with the deposited surface so as to lower the height thereof. The aluminum deposition can be replaced by coating with a conductivity.

A sound hole 11 for introducing sounds generated in the receiver 5 to the outside of the housing and projections 12 of the key sheet 7 are inserted in the upper case 1. Key holes (not illustrated) of the same number as the projections 12 and an opening (not illustrated) with the same size as the liquid crystal display portion 6 are provided therein, with the opening (not illustrated) closed with a transparent window 13 such that the user can recognize characters and marks displayed on the liquid crystal display portion 6.

The upper case 1 is made from a metal. In the present embodiment, the upper case is formed in a dye cast process with a magnesium alloy (AZ91D) containing 9% of aluminum and 1% of zinc as the material. The dye cast process is a method of forming by pouring a completely molten metal into a special mold with a high pressure.

Examples of other processes include a thixomold process of forming by pouring a half-molten metal into a special mold with a high pressure.

Moreover, the magnesium alloy has a small specific gravity among metals. The value thereof is about 1.8 g/cc, which is about ⅔ of that of the aluminum alloy. The magnesium alloy used in the upper case of the present invention is not limited to the above, and the other magnesium alloy having different characteristics may be used.

The metal upper case 1 after formed in the mold is applied with the chemical conversion treatment on the front side, and only the external surface thereof is applied with coating.

The chemical conversion treatment is an anti-corrosion treatment as well as a treatment for improving the adhesion strength of the coating. Conventionally, the so-called chromate treatment containing chromium (VI) has been used commonly as the chemical conversion treatment. However, since the chromium (VI) triggers the pollution problem, a chemical conversion treatment not containing the chromium (VI) is preferable in consideration of the influence on the environment.

In this invention, a chemical conversion treatment with phosphate having a 0.5Ω or less surface resistance value in a salt spray test (5% in concentration, left in an atmosphere at 35° C. for 50 hours) is selected. As to coating, a primer treatment is applied on the chemically converted surface, and further, a baking coat is applied thereon.

As shown in FIGS. 2A and 2B, bosses 18 to be screwed by a male screw are provided inside the upper case 1 each at two positions in the lower part, center part and upper part with respect to the longitudinal direction thereof, substantially symmetrical with each other with respect to the center line in the width direction. All the bosses 18 have a cylindrical shape with a flat portion on the upper surface. A female screw is formed by cutting in the center thereof, without having the lower end pierced through to the outside. In order to improve the mold release property at the time of shaping with a mold, a 1 degree or more draft is provided in the periphery of the cylindrical part.

The external surface of the lower case 2 comprises a rear portion 15, a battery mounting portion 16 and a cylindrical portion 17. The rear portion 15 and the battery mounting portion 16, having seat portions 20 to be pierced through by screw portions 19 at the positions corresponding to the bosses 18 of the upper case 1, are fastened by male screw head portions.

A sliding hook 21 is provided in the rear portion 15 for mounting a detachable battery 10 in the case. Since the method for mounting is the same as the contents disclosed in JP-A-10-117224, which has been filed already in Japan by the present inventor, explanation thereof is not provided herein.

The cylindrical portion 17 for surrounding the whip antenna 3 to be pulled out with respect to the housing, slightly projects from the rear surface. Since the configuration of the whip antenna 3 and the method for holding the same are the same as the contents disclosed in JP-A-9-214225, which has been already filed in Japan by the present inventor, explanation thereof is not provided herein.

To this kind of appliances, shock resistance and high rigidity are required for preventing breakage of the housing even in the case the user drops the appliance inadvertently from a hand.

Therefore, a material satisfying these properties is selected. In this embodiment, as mentioned above, the upper case 1 made from a metal is formed by the dye cast process with a magnesium alloy (AZ91D) containing 9% of aluminum and 1% of zinc is used as the material. Further, a resin material, such as acrylonitrile-butadiene-styrene (ABS), polycarbonate (PC), and an alloy material of ABS and PC, is selected as the material of the lower case 2.

At the time, the external surface is formed with the fixed side of a mold (cavity), and the internal surface is formed with the movable side (core). The peripheral parting line (seaming surface of the fixed side and the movable side) is not flat, but the battery mounting portion 16 is lower with respect to the portion with the cylindrical portion 17 formed, with both of them connected with a curved line (see FIG. 2A). This is not only for maximizing the rigidity of the metal case but also for avoiding deterioration of the characteristics of the stored antenna by providing the metal case and the stored antenna too closely.

As the stored antenna 4, a metal thin plate is attached on the case bottom surface with a double-coated adhesive tape, with a part thereof connected electrically with the printed board 9. As another embodiment, a substantially rectangular parallelopiped chip antenna device (not illustrated) can be used. As the chip antenna device, for example, a chip antenna device disclosed in JP-A-9-0102710 can be used.

Figure 3:
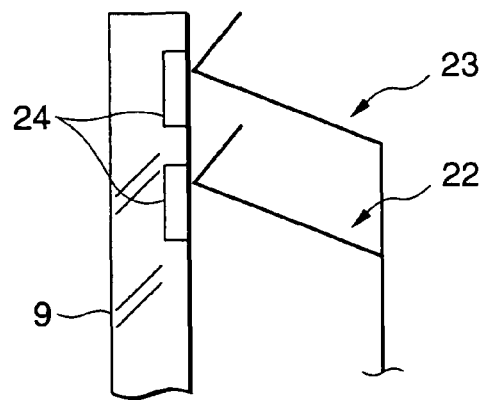
FIG. 3 is a diagram showing the state of connection between the stored antenna 4 and the printed board 9.

The stored antenna 4 is a plate-like reverse F type antenna comprising a metal thin plate to be adhered and fixed on the case bottom surface. As shown in FIG. 3, the plate-like reverse F type antenna comprises a feeder portion 22 and a short circuit portion 23 connected electrically by forcing a feeding land 24 of the printed board 9. As to the shape of the stored antenna 4, cuttings or slits are provided in a plate-like sheet metal for achieving a small size, and a λ/4 electronic length is ensured.

The stored antenna 4 is only for receipt, and the whip antenna 3 is for transmission and receipt. By providing the two antennas, a diversity radio device is realized.

The stored antenna 4 is provided on the case bottom surface so as to face to the printed board 9 on the rear surface of the printed board 9. A land (not illustrated) for electrically connecting the antenna terminal and the printed board 9 by forcing the tip of an antenna terminal (not illustrated) electrically connected with the whip antenna 3 is provided on the adjacent corner. The receiving circuit portion and the radio circuit portion (not illustrated) are formed in a region not having the land and the stored antenna 4 mounted thereon.

The shield case 14 is provided on the printed board 9 so as to cover the receiving circuit portion and the radio circuit portion, away from the stored antenna 4 of the land (not illustrated) by a predetermined distance. Furthermore, the control circuit portion (not illustrated) is formed below the receiving circuit portion and the radio circuit portion (not illustrated). The control circuit portion (not illustrated) is covered with a metal film applied on the internal surface of the lower case 2 so as to be applied with a shield.

Experiment results of the invention will be described below.

Figure 4:
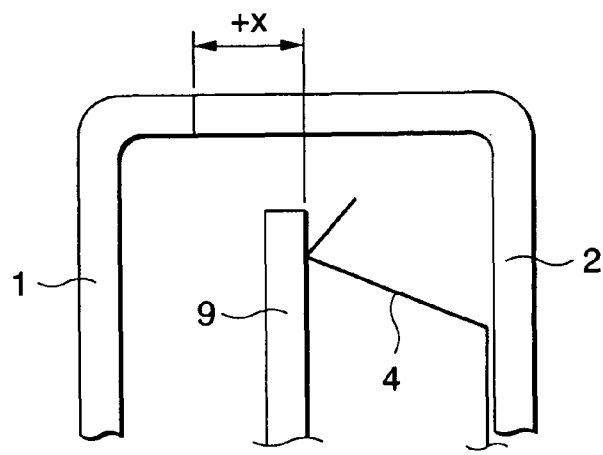
FIG. 4 is a partially enlarged diagram of the housing tip portion of FIG. 1.
Figure 5:
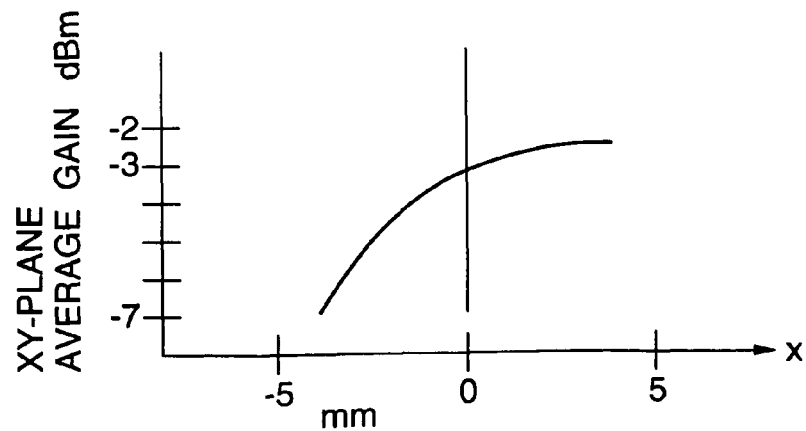
FIG. 5 is a graph showing the relationship between the distance x and the XY plane average gain of the stored antenna 4 when it is away from the rear surface of the printed board 9 by a distance x mm.
Figure 6:
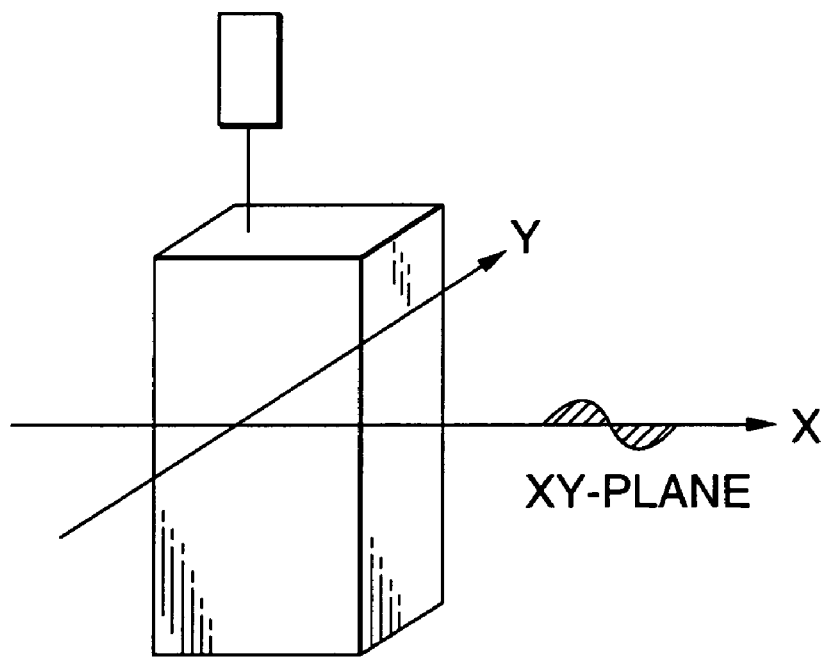
FIG. 6 is a diagram showing the XY plane in the appliance.

FIG. 4 is a partially enlarged diagram of the housing tip portion of FIG. 1. In FIG. 4, the dividing surface of the upper case 1 and the lower case 2 are away from the rear surface of the printed board 9 by a distance x mm. Measurement results of the XY plane average gain of the stored antenna 4 with the distance x changed are shown in FIG. 5. The method of taking the XY plane in an appliance is shown in FIG. 6.

As shown in FIG. 5, in the case the distance x is in the plus region, the gain is improved. The inflection point exists in the middle of about 1 mm and 0. In the region from there toward the minus direction, the gain is lowered. Therefore, it is effective to have the distance x as large as possible within the range tolerable in designing for ensuring the antenna gain. At least the distance x needs to be plus.

It is apparent that the same effect can be achieved also in the case the stored antenna is a chip antenna mounted on the rear surface of the printed board 9.

Furthermore, although it is not illustrated, earth can be provided sufficiently via the metal case and the user's hand by electrically connecting the printed board 9 and the metal upper case 1.

Moreover, the upper case and the lower case are divided with a curved line. This is for providing the device with a substantially same thickness in any portion so as to be easily grasped. Moreover, by providing the highly rigid metal surface cover like a box from the upper end to the lower end, the bend and twist rigidity of the device is improved. In the case the upper and lower cases are divided with a straight line, a substantially box-like shape can be formed in the vicinity of the liquid crystal and the receiver since the side walls can be formed thereat. However, since the key portion is lower and the side walls cannot be formed, the bend rigidity in the portion is deteriorated remarkably, and thus the dividing line is provided with a curved line as in this embodiment.

As apparent from the explanation given so far, since the present invention comprises a printed board, a resin housing provided so as to cover one side surface of the printed board, a metal housing provided so as to cover the other side surface of the printed board, and an antenna provided on the one surface side of the printed board, wherein the resin housing and the metal housing are divided in a region elongating from the one side surface to the other side surface of the printed board, the effect of providing sufficient shock resistance and high rigidity as a portable terminal device, capable of preventing breakage of the housing even in the case the user drops the device from a hand inadvertently as well as the effect of avoiding deterioration of the characteristics of the stored antenna can be achieved.

What is claimed is:

1. A radio terminal device comprising:
   a portable telephone, the portable telephone including:
      a printed circuit board having a plurality of electronic components mounted thereon and having a front surface and a rear surface;
      an internal antenna disposed on the rear surface of the printed circuit board; and
      a portable telephone housing accommodating the printed circuit board, the portable telephone housing configured by a resin housing covering the rear surface of the printed circuit board and a metal housing covering the front surface of the printed circuit board and having a metal external surface forming an external surface of the portable telephone,
      wherein at least a part of the printed circuit board, on which the internal antenna is disposed, is accommodated in the resin housing, and
      wherein the metal housing covers the front surface of the printed circuit board while leaving at least the part of the printed circuit board on which the internal antenna is disposed uncovered by the metal housing.

2. The radio terminal device according to claim 1, wherein the resin housing and the metal housing are joined with each other by a curved line from a viewpoint of the side of the radio terminal device.

3. The radio terminal device according to claim 1, wherein the printed circuit board and the metal housing are connected with each other electrically.

4. The radio terminal device according to claim 1, wherein the internal antenna is disposed near an end portion in the part of the printed circuit board.

5. A radio terminal device comprising:
   a portable telephone, the portable telephone including:
      a printed circuit board having a plurality of electronic components mounted thereon;
      an internal antenna disposed on a rear surface side of said printed circuit board; and
      a portable telephone housing for accommodating said printed circuit board and said internal antenna, said portable telephone housing configured by a metal housing so disposed as to cover a front surface of the printed circuit board and having a metal external surface forming an external surface of the portable telephone, and a resin housing so disposed as to cover a rear surface of the print circuit board,
      wherein at least a part of the rear surface side of said printed circuit board, on which the internal antenna is disposed, is accommodated in the resin housing, and
      wherein the metal housing covers the front surface of the printed circuit board while leaving at least the part of the rear surface side of the printed circuit board on which the internal antenna is disposed uncovered by the metal housing.

6. The radio terminal device according to claim 5, wherein the resin housing and the metal housing are joined with each other by a curved line from a viewpoint of the side of the radio terminal device.

7. The radio terminal device according to claim 5, wherein the printed circuit board and the metal housing are connected with each other electrically.

8. The radio terminal device according to claim 5, wherein the internal antenna is disposed near an end portion in the part of the printed circuit board.

9. The radio terminal device according to claim 1, wherein the internal antenna is accommodated in the resin housing.

10. The radio terminal device according to claim 2, wherein the curved line that joins the resin housing with the metal housing forms an inflection point on a side wall of the portable telephone housing between uppermost and lowermost portions of the portable telephone housing.

11. The radio terminal device according to claim 6, wherein the curved line that joins the resin housing with the metal housing forms an inflection point on a side wall of the portable telephone housing between uppermost and lowermost portions of the portable telephone housing.

* * * * *